United States Patent
McGee et al.

(10) Patent No.: US 8,057,645 B2
(45) Date of Patent: Nov. 15, 2011

(54) SYSTEM AND METHOD FOR PROVIDING ELECTROCHEMICAL MACHINING OF A DEVICE

(75) Inventors: Thomas S. McGee, Stratham, NH (US); Marian B. Noronha, Madbury, NH (US); Hans Hendrik Wolters, Leeuwarden (NL)

(73) Assignee: Turbocam, Inc., Barrington, NH (US)

( * ) Notice: Subject to any disclaimer, the term of this patent is extended or adjusted under 35 U.S.C. 154(b) by 1165 days.

(21) Appl. No.: 11/774,325

(22) Filed: Jul. 6, 2007

(65) Prior Publication Data

US 2009/0008264 A1   Jan. 8, 2009

(51) Int. Cl.
*B23H 3/00* (2006.01)

(52) U.S. Cl. ............ 204/223; 204/229.5; 205/651; 205/654

(58) Field of Classification Search .......... 204/223, 204/229.5; 205/651, 654
See application file for complete search history.

(56) References Cited

U.S. PATENT DOCUMENTS

| | | | |
|---|---|---|---|
| 4,772,372 A | 9/1988 | Bruns | |
| 4,851,090 A | 7/1989 | Bruns | |
| 5,662,783 A | 9/1997 | Cannon | |
| 6,355,156 B1 | 3/2002 | Li | |
| 6,402,931 B1 | 6/2002 | Zhou | |
| 6,835,299 B1* | 12/2004 | Tchugunov | 205/654 |
| 2002/0143492 A1 | 10/2002 | Wei | |
| 2006/0131184 A1* | 6/2006 | Mielke | 205/651 |
| 2007/0011836 A1* | 1/2007 | Brewer et al. | 15/220.1 |

* cited by examiner

*Primary Examiner* — Alexa D. Neckel
*Assistant Examiner* — Nicholas A. Smith
(74) *Attorney, Agent, or Firm* — Peter A. Nieves; Sheehan, Phinney, Bass + Green, PA

(57) ABSTRACT

A system and method for electrochemically machining a work-piece contains a fixture capable of receiving a work-piece and securing the work-piece to the fixture. An electrolyte source is also provided. In addition, the system contains a rotary drive subassembly capable of receiving a portion of the work-piece therein, motion of the rotary drive assembly being determined by a received control signal, wherein frequency and amplitude of the control signal increases and decreases motion of the rotary drive subassembly, and wherein the control signal is a trapezoidal waveform.

17 Claims, 10 Drawing Sheets

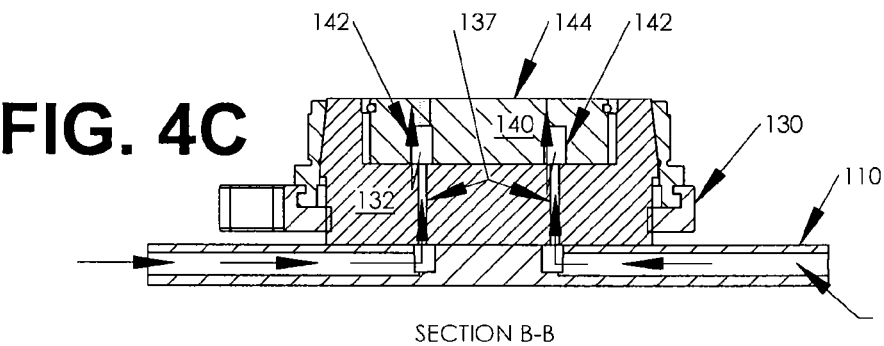
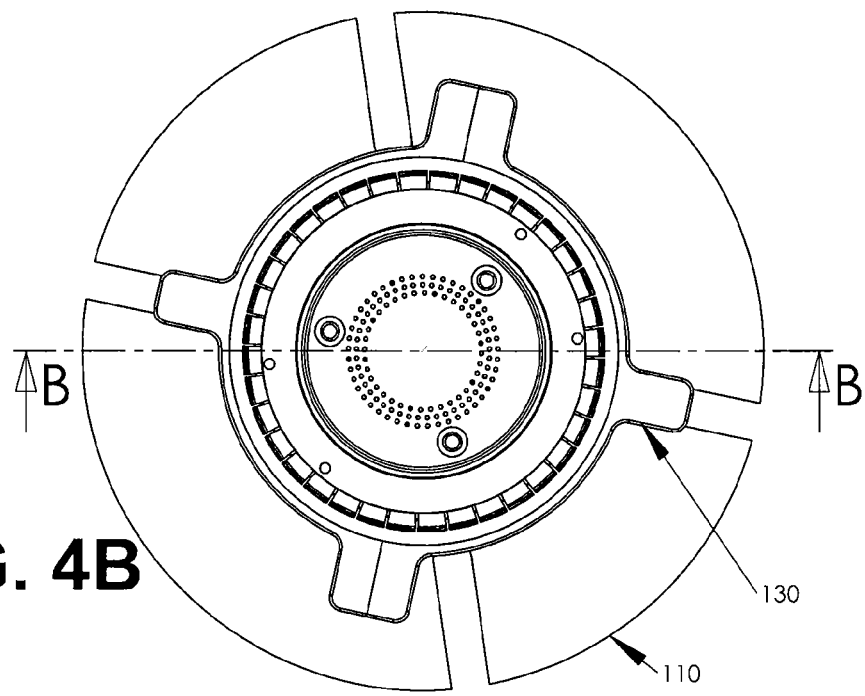
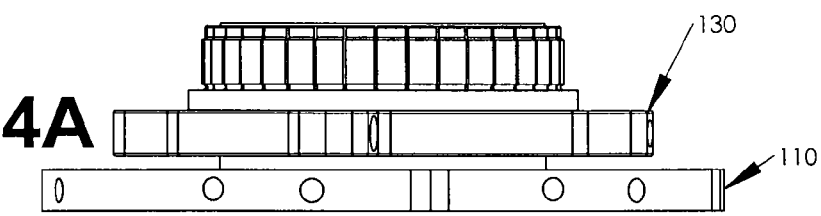

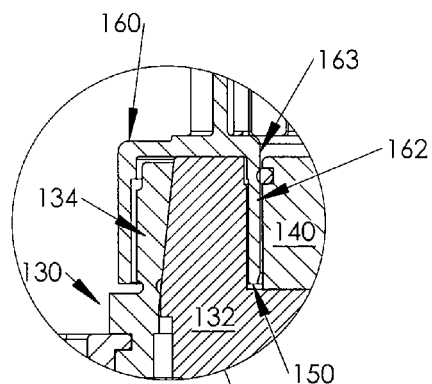
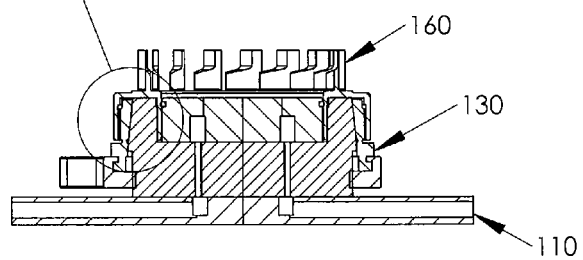
FIG. 6B
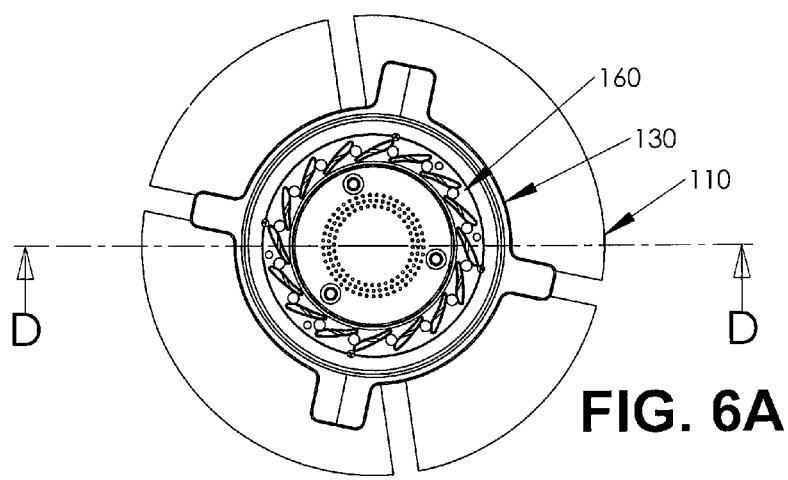
FIG. 6A

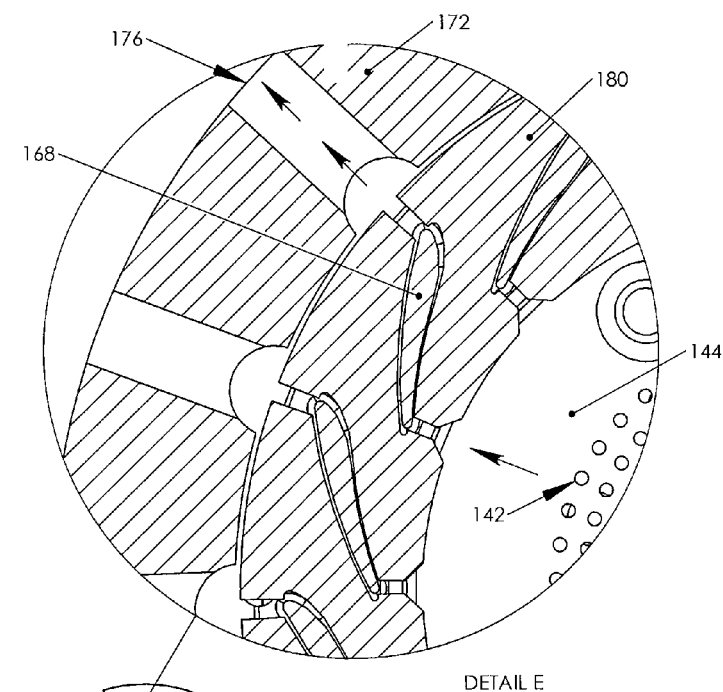
DETAIL E
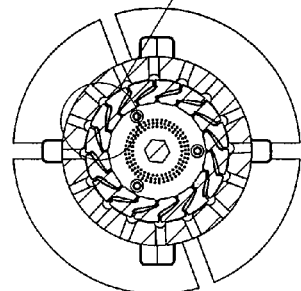
SECTION K-K
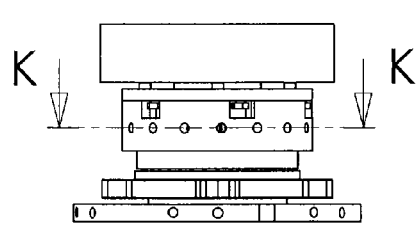
FIG. 8C
FIG. 8B
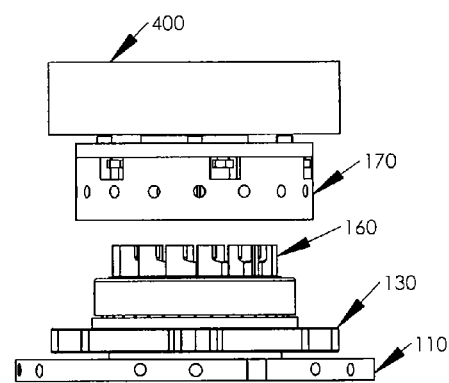
FIG. 8A

SYSTEM AND METHOD FOR PROVIDING ELECTROCHEMICAL MACHINING OF A DEVICE

FIELD OF THE INVENTION

The present invention is generally related to electrochemical machining, and more particularly is related to a system and method for providing electrochemical machining of a device such as, but not limited to, airfoils, turbocharger nozzle rings and blisks.

BACKGROUND OF THE INVENTION

Electrochemical machining is a well-known process used for the machining of a workpiece. In a typical electrochemical machining process, a workpiece is typically provided with a positive voltage to create an anode portion, and an electrode is provided with a negative voltage to create a cathode portion. An electrolyte is provided in a gap between the workpiece and the electrode for electrochemical machining of the work-piece.

As is known in the art, the gap between the anode portion and the cathode portion needs to be closely monitored and maintained in order to prevent touching of the cathode portion and the anode portion and also to maintain machined form and tolerance. In addition, the gap between the anode portion and the cathode portion needs to be maintained so as to allow an appropriate amount of electrolyte to flow therebetween.

Electrochemical machining is particularly of interest in the shaping of airfoils (i.e., single blades), turbocharger nozzle rings and bladed disks (i.e., blisks). The unique shape and size of blades of a bladed part requires intricate attention to detail in the electrochemical machining process. Due to this requirement, the amount of electrochemical machining performed is required to be closely regulated. Unfortunately, improper electrochemical machining may result in inaccurate geometry and permanent damage to the blades of the bladed part.

Thus, a heretofore unaddressed need exists in the industry to address the aforementioned deficiencies and inadequacies.

SUMMARY OF THE INVENTION

Embodiments of the present invention provide a system and method for electrochemically machining a work-piece. Briefly described, in architecture, one embodiment of the system, among others, can be implemented as follows. The system contains a fixture capable of receiving a work-piece and securing the work-piece to the fixture. An electrolyte source is also provided. In addition, the system contains a rotary drive subassembly capable of receiving a portion of the work-piece therein, motion of the rotary drive assembly being determined by a received control signal, wherein frequency and amplitude of the control signal increases and decreases motion of the rotary drive subassembly, and wherein the control signal is a trapezoidal waveform.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4A is a side view of the fixture of the system being positioned on the base of FIG. 2.

FIG. 4B is a top view of the fixture of the system being positioned on the base of FIG. 2.

FIG. 4C is a cross-sectional side view of the fixture of the system positioned on the base of FIG. 2.

FIG. 6A is a top view of the work-piece, fixture, and base as an array.

FIG. 6B is a cross-sectional side view of the work-piece, fixture, and base array of FIG. 6A, with a close-up view of connection between the work-piece and the fixture.

FIG. 8A is a schematic diagram further illustrating the system 100 of FIG. 1, where the rotary drive assembly 400 and rotary drive subassembly 170 are positioned above the work-piece 160, prior to machining. FIG. 8B is a schematic diagram further illustrating the system 100 of FIG. 1, where the rotary drive assembly 400 and rotary drive subassembly 170 are positioned above the work-piece. FIG. 8C is a cross-sectional close-up of the system 100 across axis K-K.

DETAILED DESCRIPTION

The present system and method provides for the electrochemical machining of a device, also referred to herein as a work-piece. Among other portions, the present system contains a fixture, a rotary drive subassembly, and a rotary drive assembly. A work-piece is positioned and secured to the fixture, after which the rotary drive subassembly is positioned to achieve initial machining gap. The subassembly outer shell creates a seal for the electrolyte. An electrolyte flows through the system, thereby completing a circuit between the work-piece and the subassembly. Blades of the work-piece may be electrochemically machined during completion of the circuit in accordance with motion of the rotary drive subassembly.

Motion of the rotary drive subassembly is managed by a direct drive controller, which controls frequency and amplitude of a control signal provided to the system for precisely increasing and decreasing rotational motion of the rotary drive subassembly.

Figure 1:
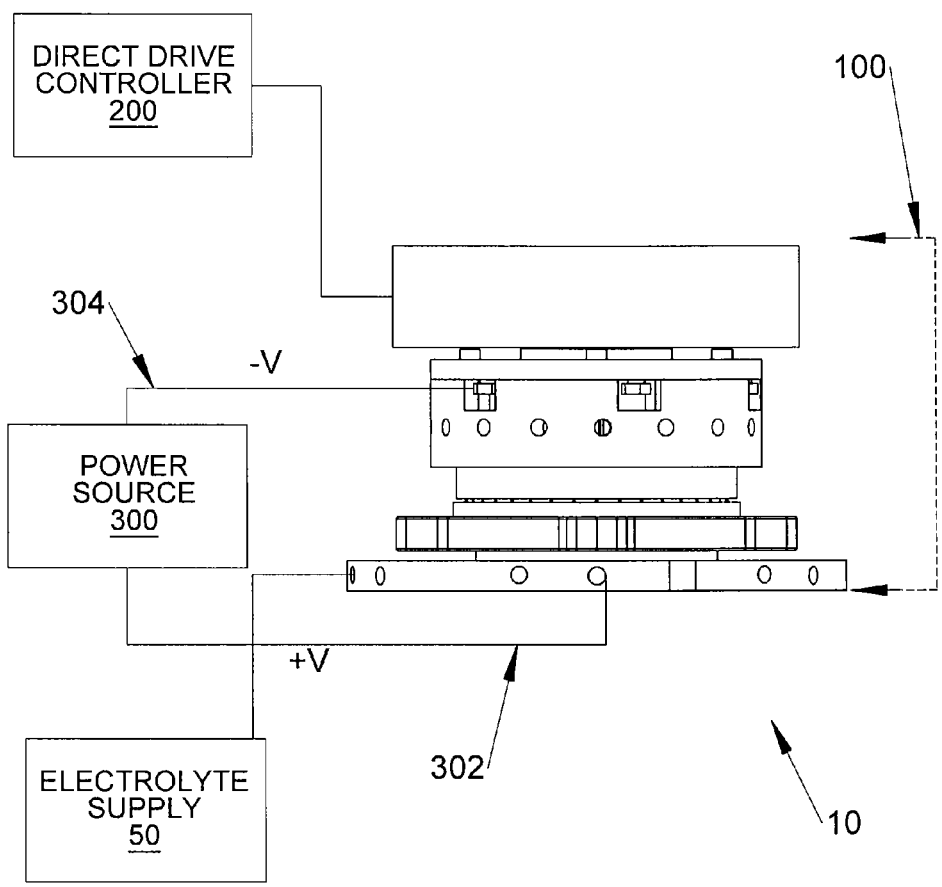
FIG. 1 is a schematic diagram illustrating an environment in which the present electrochemical machining system may be provided.

FIG. 1 is a schematic diagram illustrating an environment 10 in which the present system 100 may be provided. As is shown by FIG. 1, the present system 100 for electrochemically machining a device is in electrical communication with a direct drive controller 200 and a power source 300. The environment 10 in which the present system 100 may be provided also contains a source of electrolytic fluid (i.e., an electrolyte) 50 and a means for receiving flushed electrolytic fluid from the system 100 after the fluid has traversed the system 100.

In accordance with the first exemplary embodiment of the invention, the direct drive controller 200 is capable of precisely controlling frequency and amplitude of a control signal, which is provided to the system 100 for increasing and decreasing rotational motion of a portion of the system 100. Further description with regard to functioning of the direct drive controller 200 is provided below with regard to description of a process used by the system 100 for providing electrochemical machining of a work-piece. An example of a direct drive controller 200 includes, but is not limited to, ETEL and DSC2.

In accordance with the first exemplary embodiment of the invention, the power source 300 is a DC power source, although it should be noted that a different power source may be used. The power source 300 is capable of providing a positive voltage, via a first cable 302 to a base 110 (FIG. 2) of the system 100, thereby providing an anodic portion of the system 100, as is explained in detail below. In addition, the power source 300 is capable of providing a negative voltage, via a second cable 304 to a rotary drive subassembly 170 (FIG. 7) of the system 100, thereby providing a cathodic portion of the system 100, as is explained in detail below.

Figure 2C:
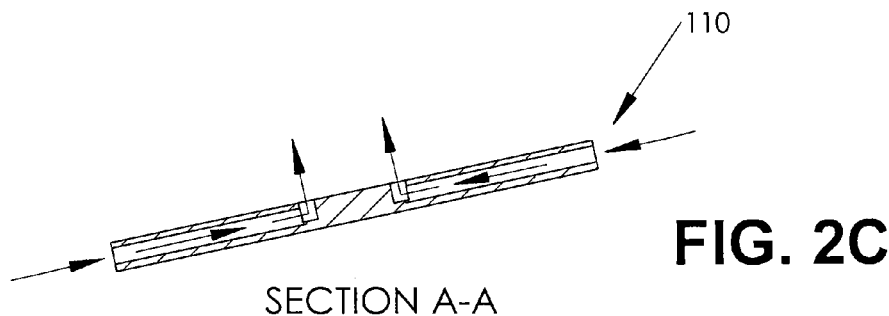
FIG. 2C is a cross-sectional side view of the base of the system of FIG. 1, showing an electrolyte flow path.
Figure 2B:
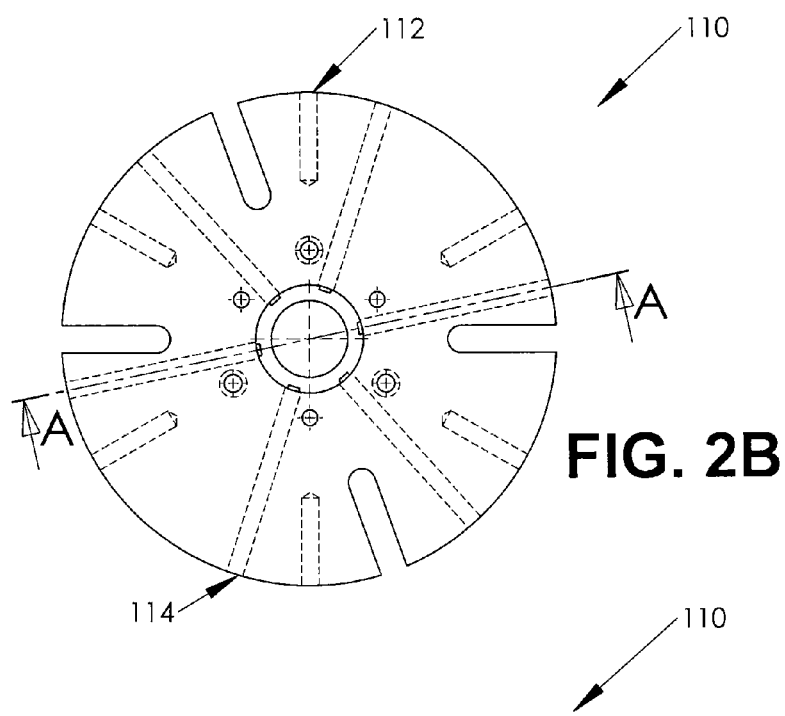
FIG. 2B is a top view of the base of the system of FIG. 1.
Figure 2A:
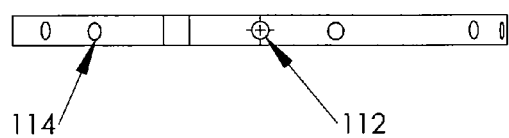
FIG. 2A is a side view of the base of the system of FIG. 1.

The following further describes portions of the system 100, and interaction between each portion. FIG. 2A, FIG. 2B, and FIG. 2C are schematic diagrams further illustrating the base 110 of the system 100. Specifically, FIG. 2A is a side view of the base 110, FIG. 2B is a top view of the base 110, and FIG. 2C is a cross-sectional side view of the base 110 along axis A-A, showing an electrolyte flow path. Main features of the base 110 include electrical connections 112, and base openings 114 for receiving and channeling electrolyte. As is shown by FIG. 2A and FIG. 2B, the base 110 may have multiple electrical connections 112 for receiving a positive voltage from the first cable 302, which is connected to the power source 300 (FIG. 1). For exemplary purposes, the base 110 is shown as having six electrical connections 112, although it should be noted that fewer or more electrical connections 112 may be provided on the base 110.

There may also be multiple base openings 114 for receiving and channeling electrolyte within the system 100. For exemplary purposes, six base openings 114 are illustrated. FIG. 2C best illustrates the electrolyte flow within the base 110, where the electrolyte is received from an outer side portion of the base 110, and released via a top central surface of the base 110. While the base is illustrated as being circular in shape, one having ordinary skill in the art would appreciate that the base 110 need not be cylindrical.

Figure 3C:
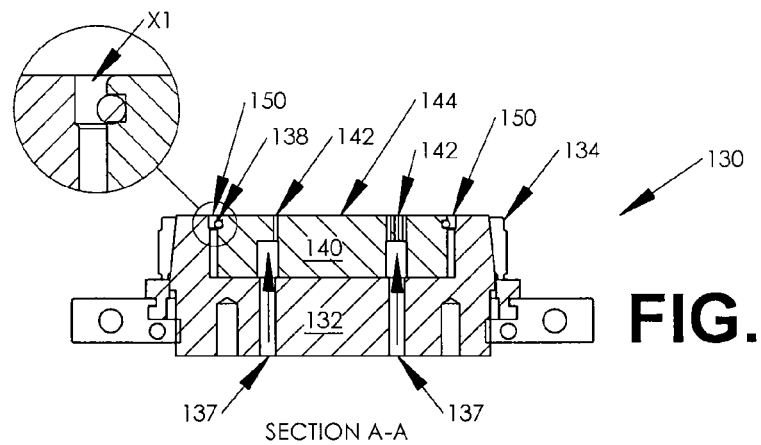
FIG. 3C is a cross-sectional side view of the fixture of the system of FIG. 1, showing an electrolyte flow path.
Figure 3B:
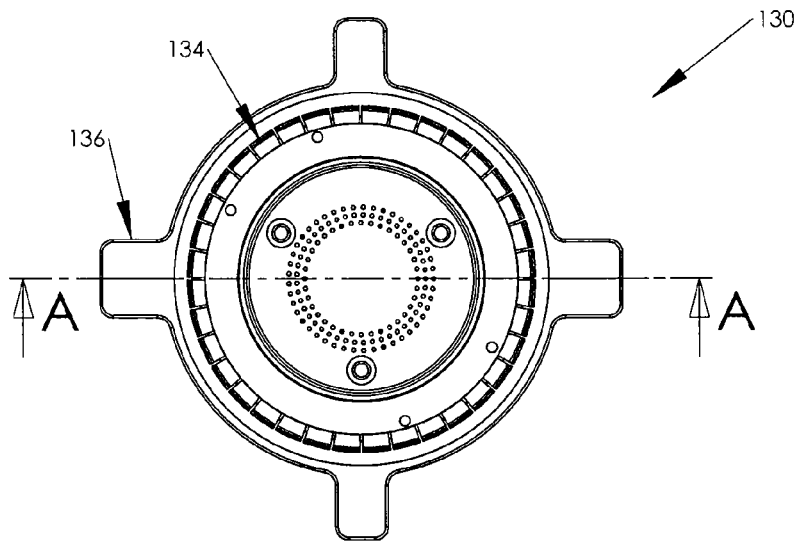
FIG. 3B is a top view of the fixture of the system of FIG. 1.
Figure 3A:
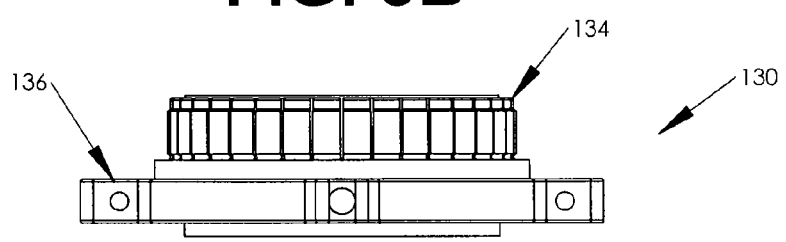
FIG. 3A is a side view of the fixture of the system of FIG. 1.

The base 110 is connected to a fixture 130. FIG. 3A, FIG. 3B, and FIG. 3C are schematic diagrams further illustrating the fixture 130 of the system 100. Specifically, FIG. 3A is a side view of the fixture 130, FIG. 3B is a top view of the fixture 130, and FIG. 3C is a cross-sectional side view of the fixture 130 showing an electrolyte flow path. The base 110 may be connected to the fixture 130 through a number of securing mechanisms such as, but not limited to, screws or bolts. In addition, the base 110 is in electrical communication with the fixture 130.

Referring to FIG. 3A, FIG. 3B, and FIG. 3C, the fixture 130 contains a conductive portion 132 and a non-conductive portion 140. The conductive portion 132 of the fixture 130 is in electrical communication with the base 110 (FIG. 2). In addition, the conductive portion 132 is capable of being removably connected to a work-piece 160 (FIG. 5). Specifically, the fixture 130 contains a mechanism for removably connecting to the work-piece 160 (FIG. 5) and securing the work-piece 160 (FIG. 5) in place. In accordance with a first exemplary embodiment of the invention, the mechanism is a collet 134 that is capable of expanding with rotation of an activation ring 136. Activation ring 136 rotation causes the collet 134 to slide down an incline located on an outer side surface of the conductive portion 132, thereby providing outward radial force to secure a work-piece 160 (FIG. 5) located thereon, the result being an outward radial force from the collet 134 into an inner surface of the work-piece 160 (FIG. 5). It should be noted that other conductive methods for connecting the conductive portion 132 of the fixture 130 to the work-piece 160 (FIG. 5) may be used, and such other methods are intended to be included within the present disclosure.

FIG. 3C further illustrates a first series of fixture openings 137 located within the conductive portion 132 of the fixture 130, which are capable of channeling electrolyte received from the base openings 114 (FIG. 2). A second series of fixture openings 142 (i.e., electrolyte diffusers) are located within the nonconductive portion 140 of the fixture 130, which are capable of receiving electrolyte from the first series of fixture openings 137. The second series of fixture openings 142 open on a top surface 144 of the non-conductive portion 140 so that electrolyte can flow out of the top surface 144 of the non-conductive portion 140.

The fixture 130 further contains a cylindrical chamber 150, which separates an outer side wall of the nonconductive portion 140 from an inner side wall of the conductive portion 132. It should be noted that the outer side wall of the nonconductive portion 140 does not touch the inner side wall of the conductive portion 132, not even conductively. The cylindrical chamber 150 has a thickness X1.

A hub of the work-piece 160 fits within the cylindrical chamber 150 and is capable of being maintained within the chamber 150, thereby maintaining the work-piece 160 (FIG. 5) in position. An o-ring 138 is positioned on a top portion of the nonconductive portion 140 side wall. In accordance with the first exemplary embodiment of the invention, the o-ring seal 138 is mechanically connected to the nonconductive portion 140 in a machined groove. It should be noted that the o-ring seal 138 may instead be removably connected to the nonconductive portion 140. As is explained in additional detail hereinbelow, the o-ring seal 138 applies pressure against the hub of the work-piece 160 when the work-piece 160 is positioned on the non-conductive portion 140 of the fixture 130. This said pressure creates electrolyte seal.

FIG. 4A, FIG. 4B, and FIG. 4C are schematic diagrams further illustrating the fixture 130 being positioned on the base 110, in accordance with the first exemplary embodiment of the invention. Specifically, FIG. 4A is a side view of the fixture 130 positioned on the base 110, while FIG. 4B is a top view of the fixture 130 positioned on the base 110, and FIG. 4C is a cross-sectional side view along axis B-B of the fixture 130 positioned on the base 110. As is shown by FIG. 4A, FIG. 4B, and FIG. 4C, the base 110 supports the fixture 130. In addition, electrolyte emitted from the a top central surface of the base 10 is received by the first series of fixture openings 137 located within the conductive portion 132 of the fixture 130, and passed to the second series of fixture openings 142 for electrolyte diffusing via the top surface 144 of the non-conductive portion 140 of the fixture 130.

Figure 5C:
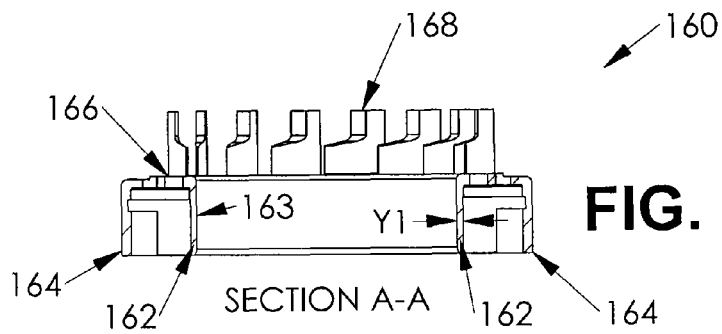
FIG. 5C is a cross-sectional side view of the work-piece of the system of FIG. 1.
Figure 5B:
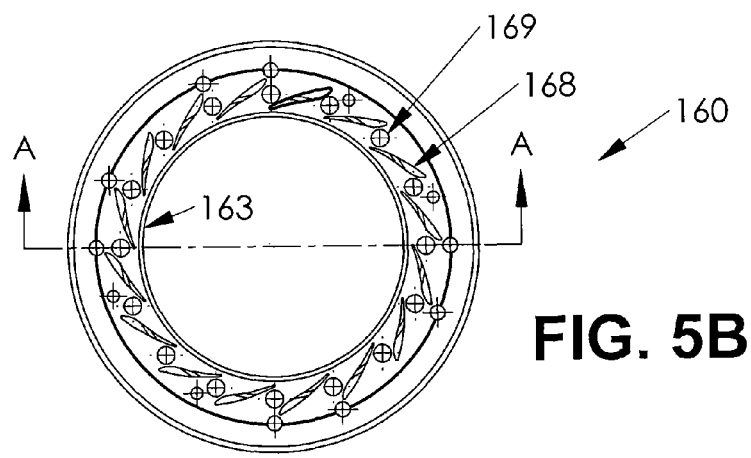
FIG. 5B is a top view of the work-piece of the system of FIG. 1.
Figure 5A:
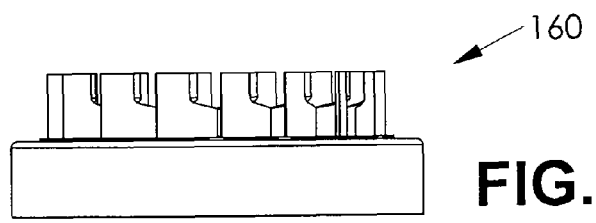
FIG. 5A is a side view of the work-piece of the system of FIG. 1.

FIG. 5A, FIG. 5B, and FIG. 5C further illustrate the work-piece 160 in accordance with the first exemplary embodiment of the invention. Specifically, FIG. 5A is a side view of the work-piece 160, while FIG. 5B is a top view of the work-piece 160 and FIG. 5C is a cross-sectional side view along axis A-A of the work-piece 160. Referring to FIG. 5A, FIG. 5B, and FIG. 5C, the work-piece 160 contains an inner hub 162 and an outer hub 164. Both the inner hub 162 and the outer hub 164 are cylindrical. In addition, a thickness Y1 of the inner hub 162 is smaller than the thickness X1 of the cylindrical chamber 150. By having the thickness Y1 of the inner hub 162 smaller than the thickness X1 of the cylindrical chamber 150, the inner hub 162 fits within the cylindrical chamber 150, thereby allowing the o-ring seal 138 of the fixture 130 to create a seal between the work-piece 160 and the nonconductive portion 140 of the fixture 130 (shown by FIG. 6B).

In accordance with the first exemplary embodiment of the invention, the work-piece 160 is a turbocharger nozzle ring (i.e., nozzle ring). As is known by those having ordinary skill in the art, a nozzle ring contains a number of blades 168 that are to be electrochemically machined. The blades 168 are positioned on a top surface of a top portion 166 of the work-piece 160 and extend in a direction perpendicular to a plane of the top surface. It should be noted that the blades 168 of the nozzle ring are positioned in the shape of a cylinder. Therefore, the nozzle ring is in the shape of a donut, with nothing located within an inner wall 163 of the inner hub 162.

FIG. 6A and FIG. 6B are schematic diagrams further illustrating the work-piece 160, fixture 130, and base 110, with the work-piece 160 positioned on the fixture 130, in accordance with the first exemplary embodiment of the invention. Specifically, FIG. 6A is a top view of the work-piece 160, fixture 130, and base 110 array. In addition, FIG. 6B is a cross-sectional side view of the work-piece 160, fixture 130, and base 110 array, with a close-up view of connection between the work-piece 160 and the fixture 130. As is shown by FIG. 6B, when the work-piece 160 is positioned on the fixture 130, the non-conductive portion 140 of the fixture 130 is positioned within the inner wall 163 of the inner hub 162 and the inner hub 162 is positioned within the cylindrical chamber 150 of the fixture 130, while being maintained in position by the expanding collet 134.

Electrolyte flow can also be seen by FIG. 6B. The close-up window of FIG. 6B further shows how the o-ring seal 138 is capable of preventing electrolyte that is emitted from the second series of fixture openings 142 from touching the inner wall 163 of the inner hub 162, and from entering into the cylindrical chamber 150 of the fixture 130. Preventing the electrolyte from entering the cylindrical chamber 150 preserves the inner hub 162 of the work-piece 160. In addition, since the central portion of the fixture 130 is nonconductive (i.e., the nonconductive portion 140), electrochemical machining of the work-piece 160 is limited to the blades 168 of the work-piece 160.

In accordance with the present disclosure, since the positive voltage traverses the base 110 to the fixture 130, the combination of the base 110 and the fixture 130 is referred to herein as the anodic portion. The positive voltage traverses the conductive portion 132 of the fixture 130 to the work-piece 160, thereby providing the work-piece 160 with a positive charge.

Figure 7C:
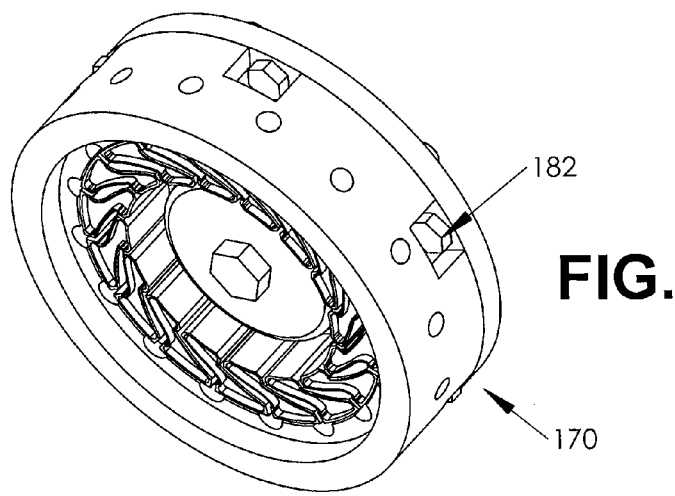
FIG. 7C is a perspective front/bottom view of the subassembly of FIG. 7A.
Figure 7B:
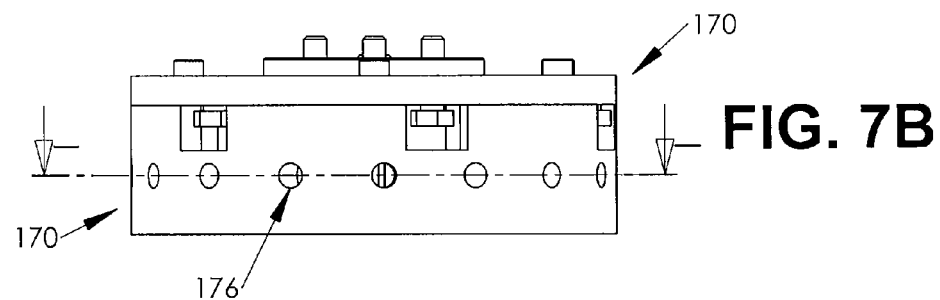
FIG. 7B is a side view of the subassembly of FIG. 7B.
Figure 7A:
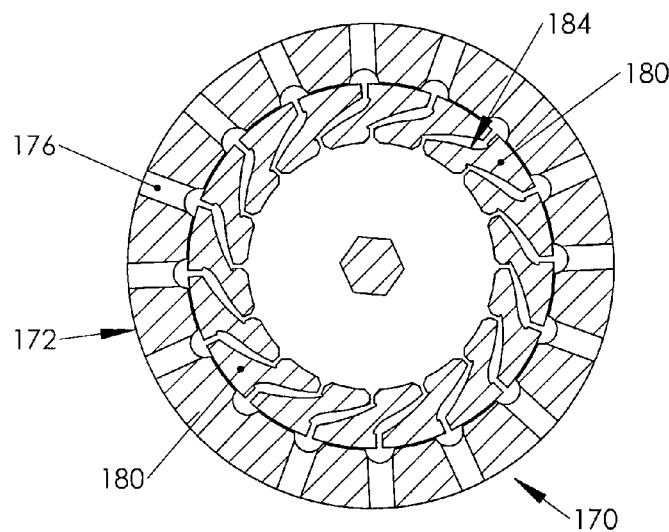
FIG. 7A is a cross-sectional top view of the subassembly of the system of FIG. 1.

FIG. 7A, FIG. 7B, and FIG. 7C further illustrate the rotary drive subassembly 170, in accordance with the first exemplary embodiment of the invention. Specifically, FIG. 7A is a cross-sectional top view of the subassembly 170, while FIG. 7B is a side view of the subassembly 170 and FIG. 7C is a perspective front/bottom view of the subassembly 170. Referring to FIG. 7A, FIG. 7B, and FIG. 7C, the subassembly 170 contains an outer shell 172 and an inner core 180.

The outer shell 172 of the subassembly 170 is a non-conductive flushing chamber for allowing electrolyte that has traversed the system 100 to exit the system 100. Specifically, after the electrolyte has been used for electrochemical machining of the work-piece 160, as is further described herein below, the used electrolyte may exit through exit holes 176 of the subassembly 170.

The inner core 180 contains a series of negative connection points 182, at least one of which is connected to the second cable 304 for receiving a negative voltage from the power source 300. Due to the negative charge of the subassembly 170, the inner core 180 is also referred to as a cathodic electrode. The inner core 180 contains slots 184 that are shaped and sized to be slightly larger than the blades 168 of the work-piece 160. Specifically, a single blade 168 is capable of being positioned within a single slot 184. Contours of the blade 168 are dictated by contours of the slots 184. Since the blades 168 are arranged in a cylindrical manner, slots 184 of the subassembly 170 are also arranged in a cylindrical manner so as to allow for accommodation of the blades 168.

It should be noted that, in accordance with an alternative embodiment of the invention, the subassembly 170 may instead contain multiple pieces that may be assembled by radial movement of the pieces of the subassembly 170. A subassembly having multiple assembled pieces allows for accommodation of work-pieces having alternative shapes.

A rotary drive assembly 400 controls motion of the rotary drive subassembly 170. FIG. 8A is a schematic diagram further illustrating the system 100 of FIG. 1, where the rotary drive assembly 400 and rotary drive subassembly 170 are positioned above the work-piece 160, prior to machining. The rotary drive assembly 400 is connected to the rotary drive subassembly 170 so as to allow for motion control of the subassembly 170.

The rotary drive assembly 400 provides for motion of the rotary drive subassembly 170 based upon control signals received from the direct drive controller 200. The direct drive controller 200 controls frequency and amplitude of the control signal provided to the direct drive controller 200 for precisely increasing and decreasing rotational motion of the rotary drive subassembly 170.

After the rotary drive assembly 400 and the rotary drive subassembly 170 are lowered into position the rotary drive assembly 400 provides for trapezoidal mechanical movement of the rotary drive subassembly 170, thereby maximizing erosion time of the blades 168. FIG. 8B is a schematic diagram further illustrating the system 100 of FIG. 1, where the rotary drive assembly 400 and rotary drive subassembly 170 are positioned above the work-piece. In addition, FIG. 8C is a cross-sectional close-up of the system 100 across axis K-K.

Figure 9:
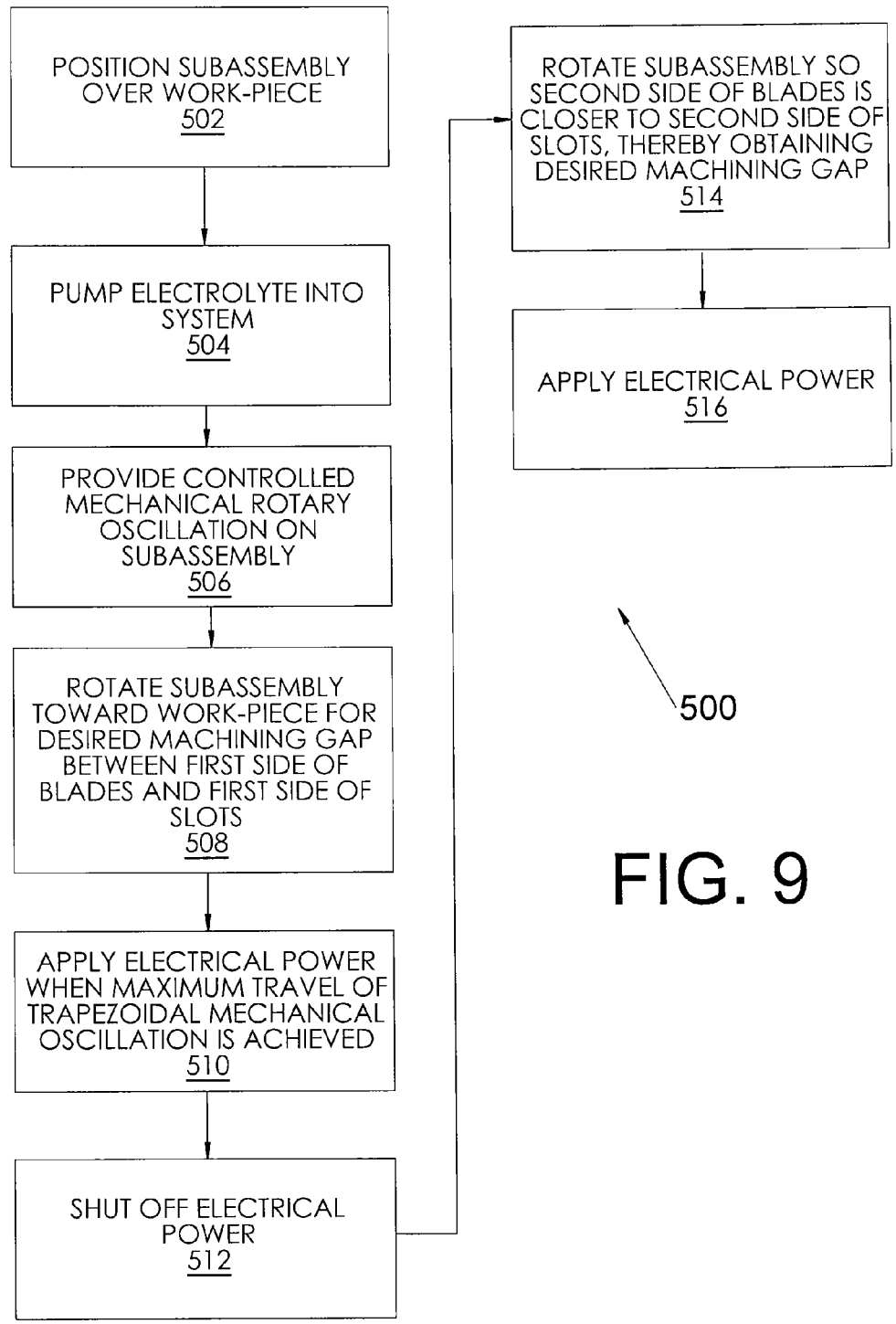
FIG. 9 is a flowchart illustrating the electrochemical machining process performed by the present system.

FIG. 9 is a flowchart 500 illustrating the electrochemical machining process performed by the present system 100. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

With the work-piece 160 positioned and secured to the fixture 130, the rotary drive subassembly 170 is positioned over the work-piece (block 502). The rotary drive subassembly is lowered down toward work-piece so that the blades are positioned in slots 184. The outer shell 172 provides seal for electrolyte. Electrolyte is pumped into the system 100 thereby completing a DC electrical circuit, as well as acting as a flushing agent of dissolved material from the work-piece 160 (block 504). Once sufficient pressure is obtained within the system 100, controlled mechanical rotary oscillation of the rotary drive subassembly 170 is provided by the rotary drive assembly 400 (block 506) in accordance with a received trapezoidal (square) waveform. The correct pressure is initially determined by experiment. Inadequate pressure for a given material removal rate will result in short circuit. Sufficient electrolyte flushing is achieved by adjusting pressure setting.

The rotary drive subassembly 170 is rotated toward the work-piece 160 to achieve a desired machining gap between a first side of the blades 168 and a first side of the slots 184 (block 508). Electrical power is applied when maximum travel of the trapezoidal (square) mechanical oscillation is achieved (block 510) resulting in electrochemical machining of the first side of the blades 168. Due to rotary oscillation, a second side of the blades 168, which is opposite the first side of the blades 168, and a second side of the slots 184 of the rotary drive subassembly 170 (i.e., cathodic electrode), which is opposite the first side of the slots 184, has a larger machining gap. The larger sized machining gap is capable of allowing flushing of dissolved materials away from the blades 168 and causes negligible machining due to low electric field.

Prior to the rotary drive subassembly 170 rotating so that the first side of the blades 168 and a first side of the slots 184 are no longer close to each other, electrical power is stopped to ensure that electrochemical machining stops (block 512). The rotary drive subassembly 170 is then rotated so that the second side of the blades 168 is closer to the second side of the slots 184, thereby obtaining a desired gap between the two (block 514). Electrical power is then applied resulting in electrochemical machining of the second side of the blades 168 (block 516). Distance between the first side of the blades 168 and the first side of the slots 184 then contains a larger sized gap capable of allowing flushing of dissolved materials away from the blades 168.

Figure 10:
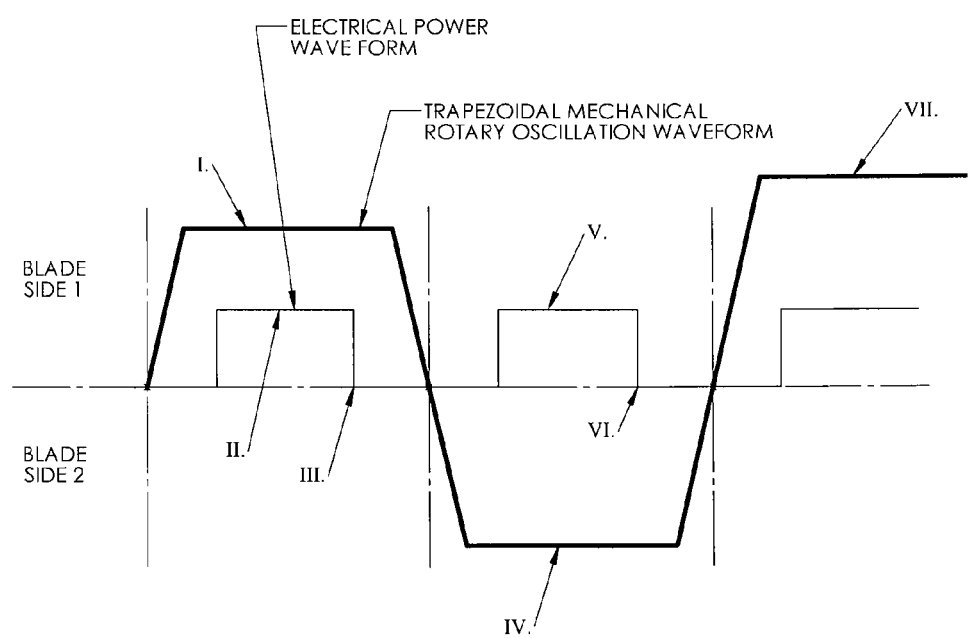
FIG. 10 is a graph illustrating a trapezoidal (square) waveform used by the system of FIG. 1, for electrochemical machining of the work-piece of FIG. 5.

The trapezoidal (square) waveform mechanical rotary oscillation, in conjunction with the on and off power cycle applied to one side while the other side flushes, is continued until a desired geometric form of both surfaces of the blades 168 is achieved. The final position is first calculated by a computer system model. During initial testing, machined test pieces are inspected with a coordinate measuring machine to determine blade shape. Adjustments are made to process to achieve desired blade shape. When proper blade shape is determined, subsequent pieces are run with same process. The inherent nature of electrochemical machining is high repeatability due to process. FIG. 10 is a graph 600 illustrating the trapezoidal (square) waveform used by the present system 100 for electrochemical machining of the work-piece 160. Referring to FIG. 10 the top portion of the graph refers to the first side of the blades 168 and the bottom portion of the graph refers to the second side of the blades 168.

As is shown by FIG. 10, both the trapezoidal (square) mechanical rotary oscillation waveform and the electrical power waveform are illustrated. Starting from the left most side of the graph, the machining gap associated with the first side of the blades 168 and the first side of the slots 184 is obtained (I.). After obtaining this machining gap, electrical power is turned on for electrochemical machining of the first side of the blades 168 (II.). Prior to movement of the rotary drive subassembly 170, the power to the system 100 is shut off quickly (III.). It should be noted that, in accordance with an alternative embodiment of the invention, reverse pole power is applied to shut off power to the system 100 quickly.

The rotary drive subassembly 170 is then rotated and positioned so that the machining gap associated with the second side of the blades 168 and the second side of the slots 184 is obtained (IV.). After obtaining this machining gap, electrical power is turned on for electrochemical machining of the second side of the blades 168 (V.). Again, prior to movement of the rotary drive subassembly 170, power to the system 100 is shut off quickly (VI.). Alternatively, in accordance with the alternative embodiment of the invention, reverse pole power is applied to shut off power to the system 100 quickly. As the machining gap increases, due to electrochemical machining, amplitude of the trapezoidal (square) increases (VII.) until final model calculated angle of rotation is achieved.

It should be noted that, while the work-piece is described herein as being a nozzle ring, a nozzle ring is only provided for exemplary purposes. One having ordinary skill in the art would appreciate that the work-piece may be another device having a different shape, such as, but not limited to, an impeller, airfoil or bladed disk (i.e. blisk). When the work-piece is a different device from the nozzle ring, the subassembly would also be a different shape so as to accommodate the different device for electrochemical machining.

One having ordinary skill in the art would appreciate that, in accordance with a second exemplary embodiment of the invention, the base and fixture may instead be cathodic, while the subassembly is anodic, as long as the electrolyte flow within the system completes a circuit between the work-piece and the subassembly so as to provide for electrochemical machining by the present system 100.

It should also be noted that, although the nozzle ring in the first exemplary embodiment contains blades that are positioned in a cylindrical manner, one having ordinary skill in the art would appreciate that the blades of the blisk may be arranged in a different manner. Further, while the rotary drive subassembly and the rotary drive assembly are described in accordance with the first exemplary embodiment of the invention as being separate, one having ordinary skill in the art would appreciate that the two components of the system may instead be incorporated into a single component of the system.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A system for electrochemically machining a work-piece, comprising: a fixture capable of receiving a work-piece and securing said work-piece to said fixture; a source of electrolyte; a direct drive controller programmed to send a control signal; and a rotary drive subassembly capable of receiving a portion of said work-piece therein for electrochemical machining, a motion of said rotary drive subassembly being determined by said control signal, wherein frequency and amplitude of said control signal increases and decreases motion of said rotary drive subassembly, and wherein said control signal is a trapezoidal waveform.

2. The system of claim 1, wherein said portion of said work-piece includes blades of said work-piece.

3. The system of claim 1, wherein said work-piece is a nozzle ring.

4. The system of claim 1, further comprising a rotary drive assembly for providing motion capability to said rotary drive subassembly.

5. The system of claim 1, further comprising a direct drive controller capable of providing said trapezoidal waveform.

6. The system of claim 1, further comprising a power source capable of providing a positive voltage to said fixture and a negative voltage to said rotary drive subassembly, flow of electrolyte from said source of electrolyte promoting completion of a circuit between said portion of said work-piece and said rotary drive subassembly resulting in said electrochemical machining of said work-piece.

7. The system of claim 6, wherein said fixture contains a series of openings for channeling said electrolyte through said fixture.

8. The system of claim 7, wherein said fixture further comprises a conductive portion and a non-conductive portion, and wherein said series of openings further comprise a first series of openings within said conductive portion and a second series of openings within said non-conductive portion.

9. The system of claim 1, wherein said fixture is capable of being secured to said work-piece by a collet.

10. A method of electrochemically machining a portion of a work-piece within a system comprising a fixture capable of receiving said work-piece and securing said work-piece to said fixture, a source of electrolyte, and a rotary drive subassembly capable of receiving a portion of said work-piece therein, said method comprising the steps of:
providing said electrolyte into said system;
providing controlled mechanical oscillation of said rotary drive subassembly in accordance with a received trapezoidal waveform;
rotating said subassembly toward said work-piece to achieve a desired machining gap between a first side of said portion of said work-piece and a first side of said subassembly;
applying electrical power to said system when maximum travel of said trapezoidal mechanical oscillation is achieved resulting in electrochemical machining of said first side of said portion of said work-piece;
changing a state of said electrical power;
rotating said subassembly toward said work-piece to achieve a desired machining gap between a second side of said portion of said work-piece and a second side of said subassembly; and
applying electrical power to said system when maximum travel of said trapezoidal mechanical oscillation is achieved resulting in electrochemical machining of said second side of said portion of said work-piece.

11. The method of claim 10, further comprising the step of determining if a predefined amount of pressure is within said system prior to said step of providing controlled mechanical oscillation of said rotary drive subassembly.

12. The method of claim 10, wherein said step of changing a state of said electrical power includes shutting off said electrical power.

13. The method of claim 10, wherein said step of changing a state of said electrical power includes reversing said electrical power.

14. A system for electrochemically machining a work-piece, comprising: a fixture capable of receiving a work-piece and securing said work-piece to said fixture; a source of electrolyte; a direct drive controller programmed to send a control signal; and a linear drive subassembly capable of receiving a portion of said work-piece therein for electrochemical machining, a motion of said linear drive subassembly being determined by said control signal, wherein frequency and amplitude of said control signal increases and decreases motion of said linear drive subassembly, and wherein said control signal is a trapezoidal waveform.

15. The system of claim 14, wherein said portion of said work-piece includes blades of said work-piece.

16. The system of claim 14, wherein said work-piece is a nozzle ring.

17. The system of claim 14, further comprising a power source capable of providing a positive voltage to said fixture and a negative voltage to said linear drive subassembly, flow of electrolyte from said source of electrolyte promoting completion of a circuit between said portion of said work-piece and said linear drive subassembly resulting in said electrochemical machining of said work-piece.

* * * * *